US012728646B2

(12) United States Patent
Chandrakanthan

(10) Patent No.: US 12,728,646 B2
(45) Date of Patent: Sep. 8, 2026

(54) APPARATUS, SYSTEM AND METHOD OF AUTOMATIC REGISTRATION AND COLOR ADJUSTMENT BASED UPON MACHINE ELEMENTS AND AMBIENT PARAMETERS

(71) Applicant: Stolle Machinery Company, LLC, Centennial, CO (US)

(72) Inventor: Sayon Chandrakanthan, Lakewood, CO (US)

(73) Assignee: STOLLE MACHINERY COMPANY, LLC, Centennial, CO (US)

( * ) Notice: Subject to any disclaimer, the term of this patent is extended or adjusted under 35 U.S.C. 154(b) by 399 days.

(21) Appl. No.: 18/237,447

(22) Filed: Aug. 24, 2023

(65) Prior Publication Data

US 2025/0065641 A1 Feb. 27, 2025

(51) Int. Cl.

| | |
|---|---|
| ***B41J 3/407*** | (2006.01) |
| ***B41F 17/22*** | (2006.01) |
| ***B41F 31/00*** | (2006.01) |
| ***B41J 2/21*** | (2006.01) |
| ***B41J 29/393*** | (2006.01) |

(52) U.S. Cl.

CPC ............. *B41J 2/2107* (2013.01); *B41F 17/22* (2013.01); *B41F 31/002* (2013.01); *B41J 3/40733* (2020.08); *B41J 29/393* (2013.01)

(58) Field of Classification Search

CPC .... B41J 2/2107; B41J 3/40733; B41J 29/393; B41F 17/22; B41F 31/002

See application file for complete search history.

(56) References Cited

U.S. PATENT DOCUMENTS

| | | | | |
|---|---|---|---|---|
| 2004/0139875 A1* | 7/2004 | Aoyama | B41F 13/22 | 101/487 |
| 2010/0319555 A1* | 12/2010 | Hashimoto | B41F 13/22 | 101/217 |
| 2012/0216689 A1 | 8/2012 | Cochran et al. | | |
| 2014/0064800 A1* | 3/2014 | Sato | G03G 15/5058 | 399/301 |
| 2020/0130345 A1* | 4/2020 | Egerton | B41F 17/22 | |

FOREIGN PATENT DOCUMENTS

WO 2022182848 A1 9/2022

OTHER PUBLICATIONS

ISA/US U.S. Patent and Trademark Office, PCT Application No. PCT/US2024/042455 International Search Report and Written Opinion, Oct. 25, 2024, 14 pages.

* cited by examiner

*Primary Examiner* — Yaovi M Ameh
(74) *Attorney, Agent, or Firm* — Eckert Seamans Cherin & Mellott, LLC

(57) ABSTRACT

An automatic registration and color adjustment system includes a can decorator including at least a plurality of plate cylinders and a plurality of inking station; a plurality of sensors; and an automatic registration and color adjustment device communicatively coupled to the can decorator, the plurality of sensors and the plurality of temperature control elements, the automatic registration and color adjustment device structured to: receive outputs from at least the plurality of sensors; determine that an adjustment to the can decorator is to be made based on the outputs and previous adjustment information; and control the can decorator to make the determined adjustment.

18 Claims, 4 Drawing Sheets

APPARATUS, SYSTEM AND METHOD OF AUTOMATIC REGISTRATION AND COLOR ADJUSTMENT BASED UPON MACHINE ELEMENTS AND AMBIENT PARAMETERS

FIELD OF THE INVENTION

The disclosed concept relates generally to an apparatus, system and method for decorating cans using a can decorator and, more particularly, to an automatic registration and color adjustment device, system and method based upon machine elements and ambient parameters associated with the can decorator machine.

BACKGROUND OF THE INVENTION

High speed continuous motion machines for decorating cans, commonly referred to as "can decorator machines" or simply "can decorators," are generally well known. FIG. 1 shows a can decorator 2. As shown in FIG. 1, a can decorator 2 includes an infeed conveyor 15, which receives cans 16 from a can supply (not shown) and directs them to arcuate cradles or pockets 17 along the periphery of spaced parallel rings secured to a pocket wheel 12. The pocket wheel 12 is fixedly secured to a continuously rotating mandrel carrier wheel 18, which in turn is keyed to a continuously rotating horizontal drive shaft 19. Horizontal spindles or mandrels (not shown), each being pivotable about its own axis, are mounted to the mandrel carrier wheel 18 adjacent its periphery. Downstream from the infeed conveyor 15, each spindle or mandrel is in closely spaced axial alignment with an individual pocket 17, and undecorated cans 16 are transferred from the pockets 17 to the mandrels. Suction applied through an axial passage of the mandrel draws the can 16 to a final seated position on the mandrel.

While mounted on a mandrel, each can 16 is decorated by being brought into engagement with a blanket (e.g., without limitation, a replaceable adhesive-backed piece of rubber) disposed on a blanket wheel of the multicolor printing unit indicated generally by reference numeral 22. Thereafter, and while still mounted on the mandrels, the outside of each decorated can 16 is coated with a protective film of varnish applied by engagement with the periphery of a varnish applicator roll (not shown) rotating on a shaft 23 in the overvarnish unit indicated generally by reference numeral 24. Cans 16 with decorations and protective coatings thereon are then transferred from the mandrels to suction cups (not shown) mounted adjacent the periphery of a transfer wheel (not shown) rotating on a shaft 28 of a transfer unit 27. From the transfer unit 27 the cans 16 are deposited on generally horizontal pins 29 carried by a chain-type output conveyor 30, which carries the cans 16 through a curing oven (not shown).

While moving toward engagement with an undecorated can 16, the blanket wheel engages a plurality of plate cylinders 31, each of which is associated with an individual inking station 32 (an exemplary eight inking stations 32 are shown in FIG. 1). The plurality of plate cylinders 31 and the inking stations 32 place a label on a can 16 based on a specification from a vendor. Typically, each inking station 32 provides a different color ink and each plate cylinder 31 applies a different ink image segment to the blanket. All of the "ink image" segments combine to produce a "main image" (i.e., a label) that is structured to be applied to the can body. The "main image" is then transferred to undecorated cans 16 and becomes, as used herein, the "can body applied image."

Each inking station 32 includes a plurality of rollers, or as used herein, "rolls," that are structured to transfer a quantity of ink from a reservoir, or as used herein an "ink fountain," to the blanket. The path that the ink travels is, as used herein, identified as the "ink train." That is, the rolls over which the ink travels define the "ink train." Further, as used herein, the "ink train" has a direction with the ink fountain 33 (as shown in FIG. 3) being at the "upstream" end of the ink train and a plate cylinder 31 at the "downstream" end of the ink train.

The ink train extends over a number of rolls each of which has a purpose. As shown, the ink train starts at the ink fountain and is initially applied as a film to a fountain roll. The fountain roll is intermittently engaged by a ductor roll. When the ductor roll engages the fountain roll, a quantity of ink is transferred to the ductor roll. The ductor roll also intermittently engages a downstream roll and transfers ink thereto. The ductor roll has a "duty cycle" which, as used herein, means the ratio of the duration of the ductor roller being in contact with the fountain roller divided by the duration of a complete cycle (ductor roller in contact with the fountain roller, move to the first downstream roller, contact with first steel roller, move back to fountain roller).

The other rolls include, but are not limited to, distribution roll(s), oscillator roll(s), and transfer roll(s). Generally, these rolls are structured to distribute the ink so that a proper amount of ink is generally evenly applied to the plate cylinder 31. For example, the oscillator rolls are structured to reciprocate longitudinally about their axis of rotation so as to spread the ink as it is applied to the next downstream roll. The final roll is the plate cylinder 31 which applies the ink to the blanket. It is understood that each inking station 32 applies an "ink image" of a single selected color to the blanket and that each inking station 32 must apply the ink image in a proper position relative to the other ink images so that the main image does not have offset ink images.

Thus, as used herein, an "ink image" means the image of a single ink color which is part of a "main image." As used herein, a "main image" means an image created from a number of ink images and which is the image that is applied to a can body as the "can body applied image." It is understood that a "main image" includes a number, and typically a plurality, of ink images. For example, if the main image was the French flag (which is a tricolor flag featuring three vertical bands colored blue (hoist side), white, and red), an inking station 32 with blue ink would provide an ink image that is a blue rectangle, an inking station 32 with white ink would provide an ink image that is a white rectangle and an inking station 32 with red ink would provide an ink image that is a red rectangle. Further, presuming that the main image was of a French flag with the hoist side on the left, the inking station 32 with blue ink would provide the blue rectangle ink image on the left side of the blanket, the inking station 32 with white ink would provide the white rectangle ink image on the center of the blanket immediately adjacent the blue rectangle ink image, and the inking station 32 with red ink would provide the red rectangle ink image on the right side of the blanket immediately adjacent the white rectangle ink image. Once all the ink images are applied to the blanket, the main image is formed and then applied to a can body.

The position of an image can be skewed, misprinted, or inefficient levels of ink for a specified optimal temperature required to apply an image on a container. In some instances, there is overlay of print layers which results in ink contamination and undesired colors being printed on the can. In this circumstance, hundreds or thousands of cans need to be discarded and the decorator shut down which leads to the can line as a whole being shut down and typically produce between 400 and 6000 cans per minute. This stoppage results in higher operating costs and large amounts of spoilage. In other instances, where the ambient air surrounding the decorator is unstable or difficult to control, the application of the ink may also become inconsistent due to the material properties being affected by the environmental temperature and the ability of the ink substrate being able to adhere to the can surface in addition to maintaining the thinnest film weight of the ink as possible. The tinctorial strength of the ink directly relates to the film thickness of the ink. The higher the tinctorial strength, the thinner the film thickness can be. If the tinctorial strength of the ink is not optimized, the film weight will need to be quicker and the decorator run slower. The typical temperature range suggested by ink manufacturers is, e.g., without limitation, between 95° and 105° F. If the ink is too cold, it will appear pin-holed on the container. If the ink temperature is too high, the ink can start to mist or apply to thinly which will also cause the image to not be shown as intended leading to higher spoilage rates. In both cases, the inability to adjust the temperature can lead to excessive ink application as an operator may increase ink flow to increase ink coverage in this circumstance. A typical decorator fountain can hold 50 ounces of ink and can be replenished on an hourly basis. In cases where the operator is compensating for poor ink density or temperature, the ink usage can easily double.

Further, as the can decorator 2 operates, the can decorator components may expand or shrink as a result of the change in temperatures (e.g., without limitation, ambient temperatures, decorator components temperatures, etc.). Such temperature changes, e.g., heating or cooling, may cause a label to drift, skew, or even overlap when it is being printed on undecorated cans 16. Further, as the temperatures change, the moisture level around the can decorator 2 also changes, resulting in, e.g., without limitation, dilution of ink concentration. Currently, operators of a can decorator 2 visually inspect the printed cans 16 for image registration including color registration manually or via cameras. However, such inspection may not detect a defect, i.e., drift, skewing, overlapping, color dilution, etc., of the printed label until after a substantial period (e.g., without limitation, several minutes) has passed from the onset of such defect on the cans, resulting in spoilage of thousands of cans. Moreover, any data associated with any adjustments made to correct the image registration defects are neither collected nor stored, leaving each instance of error detection and correction to be relied upon trial-and-error relying heavily on the guesswork by the operators. Such an ad hoc error detection and correction process results in significant waste in manufacturing time and costs.

There is room for improvement in correcting defects in label printing during the can manufacturing process.

SUMMARY OF THE INVENTION

These needs, and others, are met by an automatic registration and color adjustment system including a can decorator including a plurality of plate cylinders and a plurality of inking stations, each plate cylinder being associated with an individual inking station; a plurality of sensors including an ambient temperature sensor structured to sense an ambient temperature associated with the can decorator and a component temperature sensor structured to sense a component temperature associated with one or more components of the can decorator; and an automatic registration and color adjustment device communicatively coupled to the can decorator and the plurality of sensors and including a memory structured to store previous adjustment information associated with the can decorator, the automatic registration and color adjustment device being structured to: receive outputs of the plurality of sensors; determine an adjustment to one or more components of the can decorator based on the outputs of the plurality of sensors and the previous adjustment information; and control the can decorator to make the determined adjustment.

Another example embodiment of the disclosed concept provides a method of automatic registration and color adjustment. The method includes providing an automatic registration and color adjustment system that comprises: (i) a can decorator including a plurality of plate cylinders and a plurality of inking stations, each plate cylinder being associated with an individual inking station; (ii) a plurality of sensors including an ambient temperature sensor structured to sense an ambient temperature associated with the can decorator and a component temperature sensor structured to sense a component temperature associated with one or more components of the can decorator; and (iii) an automatic registration and color adjustment device communicatively coupled to the can decorator and the plurality of sensors and including a memory structured to store previous adjustment information associated with the can decorator; receiving, by the automatic registration and color adjustment device, outputs of the plurality of sensors; determining, by the automatic registration and color adjustment device, an adjustment to one or more components of the can decorator based on the outputs of the plurality of sensors and the previous adjustment information; and controlling the can decorator to make the determined adjustment.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
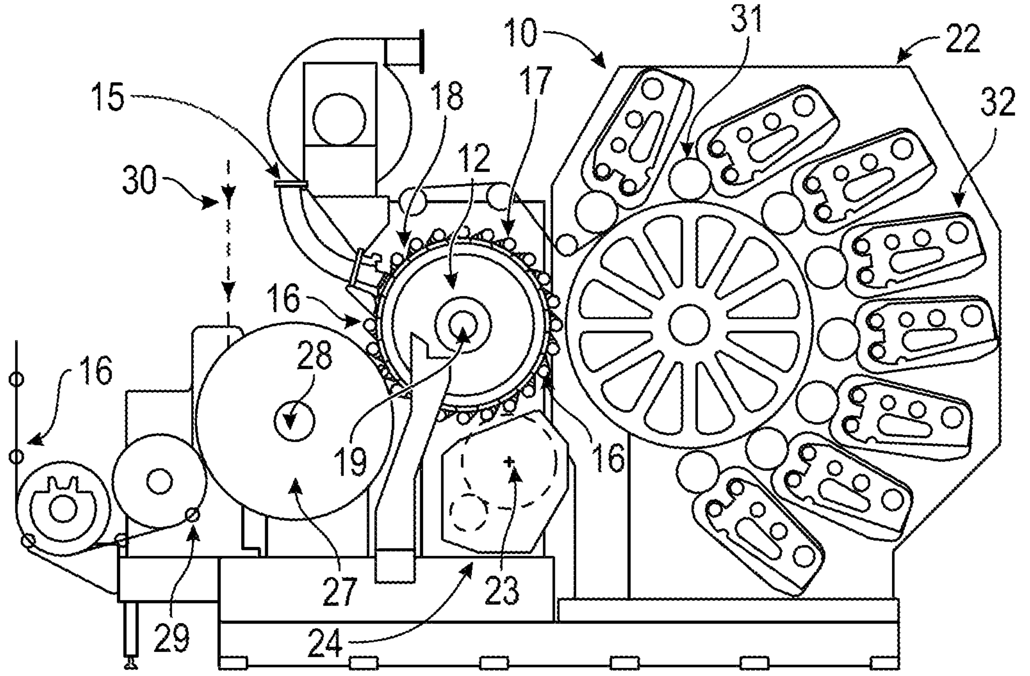
FIG. 1 is an exemplary can decorator.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together or act upon/with each other in some manner. For example, an automobile has four tires and four hub caps. While all the elements are coupled as part of the automobile, it is understood that each hubcap is "associated" with a specific tire.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein. "at" means on and/or near relevant to the term being modified as would be understood by one of ordinary skill in the art.

Example embodiments of the disclosed concept provide an automatic registration and color adjustment device, system and method for printing labels on undecorated cans during a can manufacturing process. Upon receiving outputs of a plurality of sensors including an ambient temperature sensor and a component temperature sensor, the automatic registration and color adjustment device determines an adjustment to one or more components of a can decorator based on the outputs and previous adjustments information associated with the can decorator made to one or more can decorator components in response to a specific temperature change associated with the adjusted can decorator components, and controls the can decorator to make the determined adjustment. Such automatic registration and color adjustment is advantageous in that it proactively adjusts the can decorator immediately upon detecting temperature change that requires the adjustment, rather than waiting until detection of a defect in printed labels subsequently as required by the conventional registration and color adjustment systems and methods, thereby significantly reducing can spoilage and saving time. Based on collected and stored data including at least previous adjustments made and corresponding sensor information that are typically discarded, the automatic registration and color adjustment device instantly determines a type and/or a degree of adjustment required for corresponding current temperature change, and immediately controls the can decorator to make the adjustment required, thereby significantly reducing the amount of can spoilage that would otherwise result when the conventional registration and color adjustment systems using ad hoc manual adjustments based on the guesswork are applied.

Figure 2:
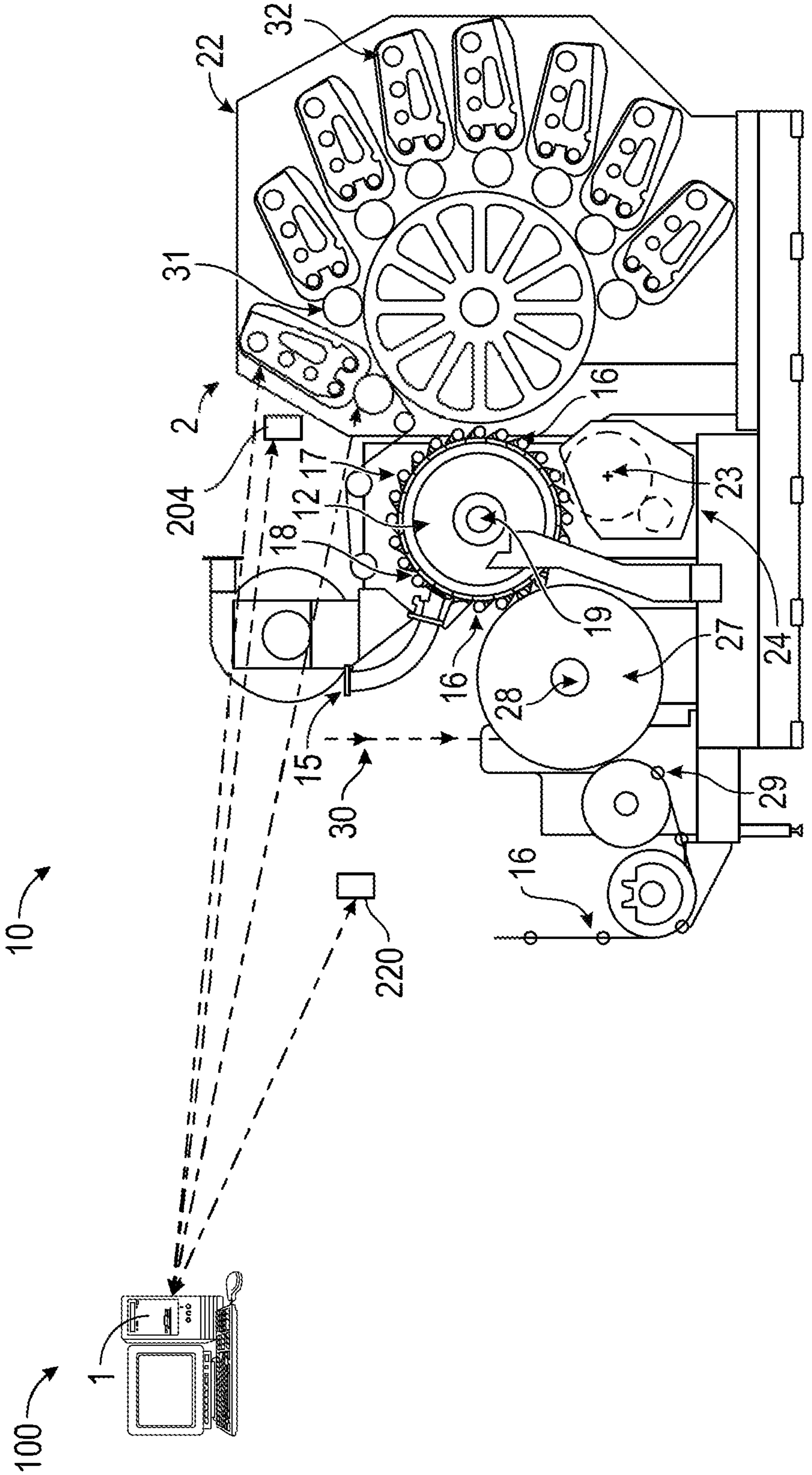
FIG. 2 is an exemplary automatic registration and color adjustment system according to a non-limiting, example embodiment of the disclosed concept.
Figure 3:
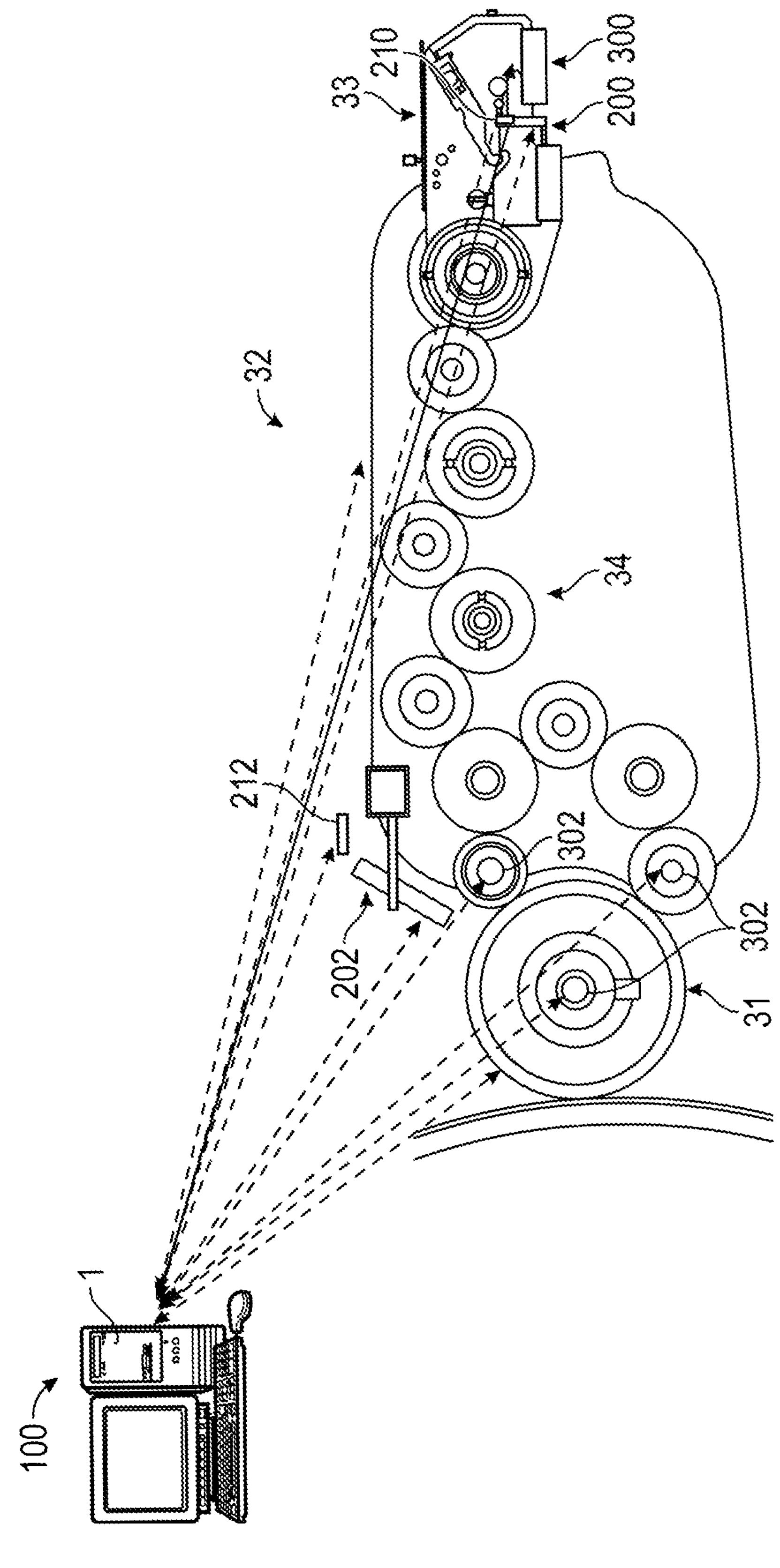
FIG. 3 is a schematic diagram of a plate cylinder with an associated inking station having an ink fountain and a roller assembly with temperature sensing and adjustment in accordance with a non-limiting, example embodiment of the disclosed concept.

FIG. 2 illustrates an automatic registration and color adjustment system 10 in accordance with a non-limiting, example embodiment of the disclosed concept. FIG. 3 is a schematic diagram of a plate cylinder 31 with an associated inking station 32 having an ink fountain 33 and a roller assembly 34 with temperature sensing and adjustment in accordance with a non-limiting, example embodiment of the disclosed concept. The automatic registration and color adjustment system 10 is described with reference to FIGS. 2-3. The automatic registration and color adjustment system 10 includes a can decorator 2, a plurality of sensors 200, 202,204,210,212,220, a plurality of temperature control elements 300,302, and an automatic registration and color adjustment device 1. The plurality of sensors include, e.g., without limitation, ambient temperature sensors 204 structured to sense an ambient temperature associated with the can decorator 2 and component temperature sensors structured to sense a component temperature associated with one or more components of the can decorator 2, such as ink temperature sensors 200,202. The plurality of sensors may also include humidity sensors 210,212 and visual sensors 220.

Ink temperature sensors 200,202 may be, for example, a contact ink temperature sensor 200 that senses temperature via direct contact with the ink, or a non-contact ink temperature sensor 202 that senses temperature without direct contact. The ink temperature sensors 200,202 may be disposed at any suitable location in each inking station 32, e.g., without limitation, at the blanket wheel, at a mandrel, at various points on the roller assembly, in the fountain 33, etc. Humidity sensors 210,212 may be disposed adjacent to or in proximity to the one or more ink temperature sensors 200,202 and structured to measure humidity associated with respective components of the inking station 32. An ambient temperature sensor 204 may be disposed at any suitable location, e.g., at or in proximity to the can decorator 2. If the ambient temperature sensor 204 is disposed in close proximity to a can decorator component, e.g., a plate cylinder, it may detect temperature of the can decorator component. The visual sensors 220 may be cameras that are disposed at any suitable locations in the can making process such as, for example and without limitation, at a chain-type output conveyor 30, a transfer wheel, inside a curing oven, or any other suitable locations, and structured to capture images of cans 16 as they pass through an inspection window.

Temperature control elements 300,302 may be disposed at any suitable location. For example, a temperature control element may be, e.g., without limitation, a heating element 300 disposed at the fountain 33 of each inking station 32. In another example, a temperature control element 302 may be, e.g., without limitation, cooling ports that are included in one or more of the rolls of the roller assembly and/or the plate cylinder 31.

In general, the properties of the ink can be altered as a result of a change in ambient temperature and component temperature, and allow for the most optimal and efficient ink application to the print blanket and can 16 for each ink type. As a result of the change in temperature, the printed cans 16 may include, e.g., without limitation, image registration error, ink density error, ink color error, ink smearing, other image defects. In order to eliminate or reduce such defects, an adjustment to one or more can decorator components needs to be made in response to detecting the temperature change. Conventionally, can decorator operators manually adjust can decorator components by looking at the defects on the cans. However, by the time the defects are detected, thousands of can spoilage have already occurred. Further, such manual adjustment is based on the guesswork of the operators and repeated until the defects are corrected, resulting further can spoilage and wasting manufacturing time. In addition, any information used to make the manual adjustments as well as the adjustments are not stored, thereby wasting useful information that can be utilized for future adjustments. The automatic registration and color adjustment device 1 of the disclosed concept advantageously collects and stores such previous adjustment information and significantly reduces such can spoilage by automatically making appropriate adjustments to can decorator components based on the previous adjustment information.

The automatic registration and color adjustment device 1 is coupled to at least the can decorator 2, sensors 200,202, 204,210,212,220 and the ink temperature control element 300,302. The automatic registration and color adjustment device 1 may be disposed within a control station 100 structured to control the operation of the can decorator 2 and the components thereof. The control station 100 may be, e.g., without limitation, a computer, a workstation, etc. disposed in vicinity of the can decorator 2. While FIGS. 2 and 3 illustrate the automatic registration and color adjustment device 1 disposed within the control station 100, it will be appreciated that the automatic registration and color adjustment device 1 may be a standalone device, e.g., without limitation, a PC or workstation solely structured to automatically create labels without departing from the scope of the disclosed concept. The automatic registration and color adjustment device 1 may be, for example and without limitation, a microprocessor, a microcontroller, or some other suitable processing device or circuitry. It may include memory, which can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory includes instructions or codes for performing the automatic registration and color adjustment operations. It is structured to also store current and previous adjustment information. The memory may also include machine learning algorithm configured to train based on the stored data and execute the instructions based on the training.

The automatic registration and color adjustment device 1 is communicatively coupled to the can decorator 2 in a wired or wireless connection and structured to receive outputs of the plurality of sensors 200,202,204,210,212,220, determine an adjustment to a one or more components of the can decorator 2 based on the outputs and previous adjustment information, and control the can decorator 2 to make the determined adjustment. The previous adjustment information is collected and stored over a predefined period, e.g., without limitation, at least a day, and updated continuously by the automatic registration and color adjustment device 1.

The previous adjustment information includes a specific temperature change, date and time associated with the specific temperature change, effects of the specific temperature change on one or more specific can decorator components, a specific type and/or a degree of adjustment made to the one or more specific can decorator components in response to the specific temperature change, and correlation data between the specific temperature change, the date and time associated with the specific temperature change, the effects thereof and the specific type and/or degree of adjustment made. It is to be understood that a temperature change may accompany corresponding humidity change, and thus the previous adjustment information may be based on the temperature change as well as the corresponding humidity change where it may not be specifically stated as such. For determining an adjustment to one or more components of the can decorator 2, the automatic registration and color adjustment device 1 is further structured to compare current temperature change to the previous temperature changes in the correlation data and determine a type and/or a degree of the adjustment. The automatic registration and color adjustment device 1 controls the can decorator 2 to make the adjustment based on the determined type and/or degree.

For example, the ink temperature sensor 200 outputs temperature information at respective ink fountain 33 to the automatic registration and color adjustment device 1. The automatic registration and color adjustment device 1 receives and analyzes the output of the ink temperature sensor 200, and determines if an adjustment to the respective ink fountain 33 is to be made based on the output and the correlation data. For example, if the automatic registration and color adjustment device 1 detects temperature changing at the respective ink fountain 33 to be outside of a threshold (e.g., without limitation, an optimal ink temperature ranging between 95° and 105° F.), it causes the temperature control element 300 disposed at the respective ink fountain 33 to control the temperature thereof. That is, the automatic registration and color adjustment device 1 activates the temperature control element 300 and raises the temperature at the ink fountain 33 to be within the threshold such that any further detects can be prevented immediately. In another example, the ink temperature sensor 202 outputs temperature information associated with adjacent ink rollers, fountain blades, and/or plate cylinder 31. The automatic registration and color adjustment device 1 receives and analyzes at least the output of the ink temperature sensor 202, and determines if an adjustment to the associated roller(s), fountain blades, and/or plate cylinder 31 (e.g., translational, circumferential, and/or plate pressure adjustments) is to be made based on the output and the correlation data. That is, if the automatic registration and color adjustment device 1 detects temperature changing at one or more ink rollers to be outside of the threshold, it causes the temperature control element 302 disposed adjacent to the one or more ink rollers to control the temperature thereof. For example, if the temperature at one or more ink rollers has risen, e.g., without limitation, due to overheating of the ink rollers as a result of continuous operation, the automatic registration and color adjustment device 1 activates the temperature control element 302, which in turn cools down the temperature at the overheated ink roller(s) to be within the threshold such that any further detects can be prevented immediately.

In yet another example, the ink temperature sensor 202 or an ambient temperature sensor 204 in proximity to a plate cylinder 31 outputs temperature information associated with the plate cylinder 31 to the automatic registration and color adjustment device 1. The automatic registration and color adjustment device 1 receives and analyzes the output of the ink temperature sensor 202 or the ambient temperature sensor 204, and determines an adjustment to the plate cylinder 31. For example, upon detecting a temperature change that has been shown to cause expansion or contraction of the plate cylinder 31 (e.g., without limitation, a translational adjustment assembly, a circumferential adjustment assembly of respective plate cylinder shaft, and/or plate pressure, etc.) based on the correlation data, the automatic registration and color adjustment device 1 may, e.g., without limitation, cause an affected can decorator component (e.g., without limitation, the translational adjustment assembly, the circumferential assembly, and/or plate pressure) to be moved such that the image registration and ink on the cans 16 are printed as specified by the label specification; and/or activate the temperature control element 302 until the temperature returns to the threshold. In some examples, the affected can decorator components include e.g., without limitation, a plate cylinder(s) and/or can decorators components surrounding the plate cylinder(s), e.g., without limitation, a translational adjustment assembly of plates, a circumferential assembly of the plates, a plate pressure (e.g., without limitation, a plate pressure spring), fountain blades, rollers, and/or any other can decorator components that may be affected by temperature changes.

In yet another example, if the automatic registration and color adjustment device 1 receives outputs of ink temperature sensors 200,202 and detects a temperature change at one or more elements in the associated inking station 32 that requires color adjustment based on the correlation data, the automatic registration and color adjustment device 1 determines a type of color adjustment to be made and automatically causes the color adjustment to occur immediately. For example, if the automatic registration and color adjustment device 1 detects a temperature change that has been shown to alter the ink density based on the correlation data, it automatically controls various components of the can decorator 2 such as, for example, plate pressure or pneumatic ductor interval to adjust ink density to a desired or specified level by a label specification.

These examples are for illustrative purposes only, and thus it will be appreciated that other types and/or degrees of adjustments to the can decorator 2 may be made as appropriate without departing from the scope of the disclosed concept. For example, the automatic registration and color adjustment device may determine that an affected plate cylinder 31 or ink fountain 33 should be replaced.

Figure 4:
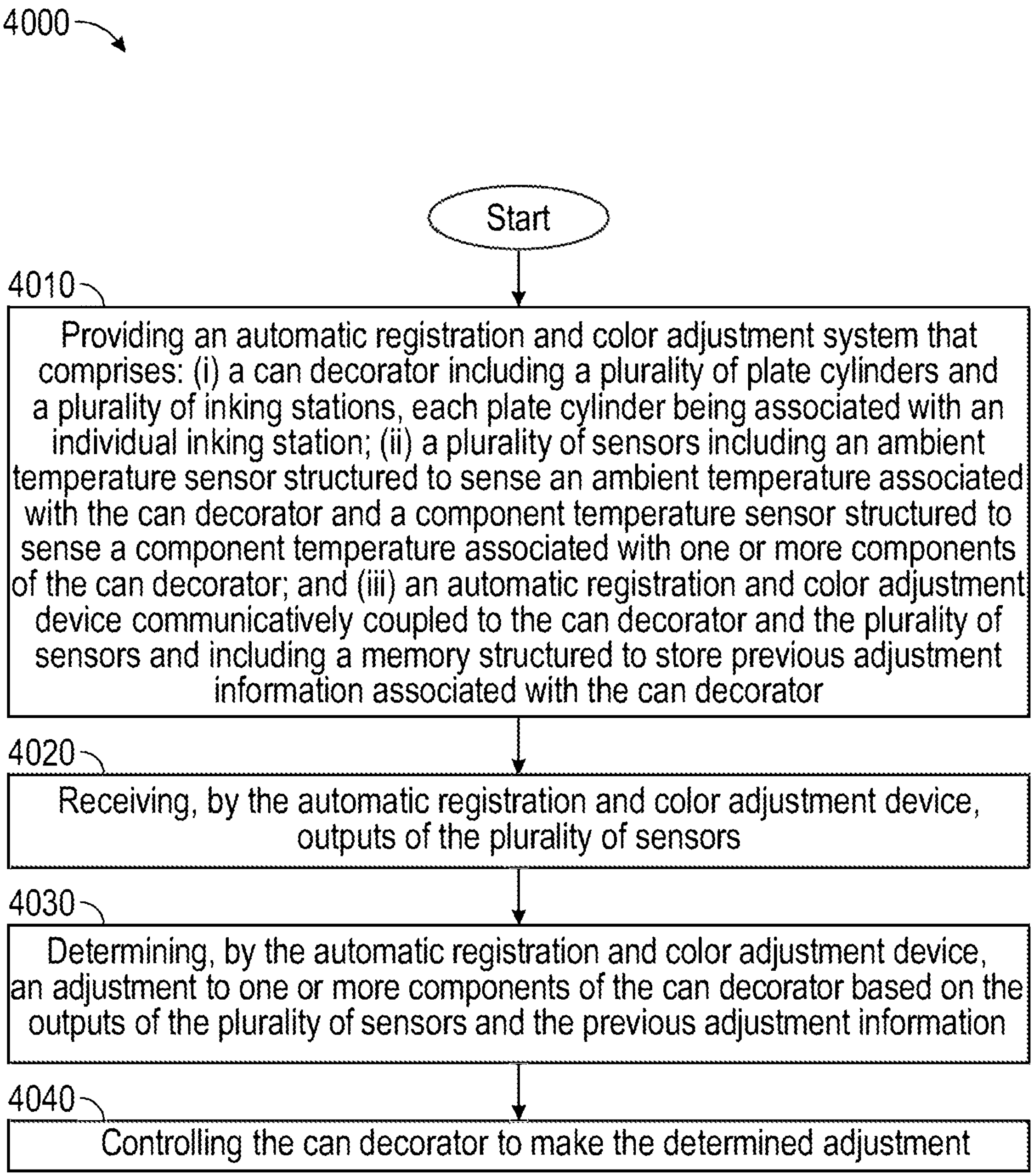
FIG. 4 is a flow chart for a method of automatic registration and color adjustment according to a non-limiting, example embodiment of the disclosed concept.

FIG. 4 is a flow chart for a method 4000 of automatic registration and color adjustment using an automatic registration and color adjustment system according to a non-limiting, example embodiment of the disclosed concept. The automatic registration and color adjustment system is similar to the automatic registration and color adjustment system 10 as described with reference to FIGS. 2-3. The method 4000 may be performed by the automatic registration and color adjustment system 10 or the components thereof.

At 4010, an automatic registration and color adjustment system is provided. The automatic registration and color adjustment system comprises: (i) a can decorator including a plurality of plate cylinders and a plurality of inking stations, each plate cylinder being associated with an individual inking station; (ii) a plurality of sensors including an ambient temperature sensor structured to sense an ambient temperature associated with the can decorator and a component temperature sensor structured to sense a component temperature associated with one or more components of the can decorator; and (iii) an automatic registration and color adjustment device communicatively coupled to the can decorator and the plurality of sensors and including a memory structured to store previous adjustment information associated with the can decorator.

At 4020, the automatic registration and color adjustment device receives outputs of the plurality of sensors.

At 4030, the automatic registration and color adjustment device determines an adjustment to one or more components of the can decorator based on the outputs of the plurality of sensors and the previous adjustment information.

At 4040, the automatic registration and color adjustment device controls the can decorator to make the determined adjustment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An automatic registration and color adjustment system, comprising:

a can decorator including a plurality of plate cylinders and a plurality of inking stations, each plate cylinder being associated with an individual inking station;

a plurality of sensors including an ambient temperature sensor structured to sense an ambient temperature associated with the can decorator and a component temperature sensor structured to sense a component temperature associated with one or more components of the can decorator; and an automatic registration and color adjustment device communicatively coupled to the can decorator and the plurality of sensors and including a memory structured to store previous adjustment information associated with the can decorator, the automatic registration and color adjustment device being structured to:

receive outputs of the plurality of sensors;

determine an adjustment to one or more components of the can decorator based on the outputs of the plurality of sensors and the previous adjustment information; and control the can decorator to make the determined adjustment, wherein the previous adjustment information comprises a specific temperature change, time and date associated with the specific temperature change, effects of the specific temperature change on one or more specific can decorator components and a specific type and/or degree of adjustment made to the one or more specific can decorator components in response to the specific temperature change, and correlation data between the specific temperature change, the time and date associated with the specific temperature change, the effects of the specific temperature change and the specific type and/or degree of adjustment made.

2. The system of claim 1, wherein for determining an adjustment to one or more components of the can decorator, the automatic registration and color adjustment device is further structured to:

compare current temperature change to previous temperature changes in the correlation data; and determine a type and/or a degree of the adjustment based on the correlation data.

3. The system of claim 1, further comprising:

a plurality of temperature control elements disposed in each plate cylinder and/or the associated inking station, the temperature control elements being structured to control ink temperature and/or plate cylinder temperature, a temperature control element comprising a heating element or a cooling element.

4. The system of claim 1, wherein the determined adjustment comprises activating a temperature control element disposed at or adjacent to a can decorator component to control temperature thereof based on the outputs and the correlation data.

5. The system of claim 4, wherein the outputs include temperature information at an ink fountain of an inking station and wherein, upon detecting temperature changing at the ink fountain to be outside of a threshold, the automatic registration and color adjustment device causes a temperature control element disposed at the ink fountain to control the temperature thereof.

6. The system of claim 4, wherein the outputs include temperature information associated with adjacent ink rollers of an inking station, and wherein, upon detecting a temperature changing at one or more adjacent ink rollers to be outside of a threshold, the automatic registration and color adjustment device causes the temperature control element disposed adjacent to the one or more adjacent ink rollers to control the temperature thereof.

7. The system of claim 1, wherein the determined adjustment comprises moving an affected can decorator component based on the outputs and the correlation data.

8. The system of claim 7, wherein the outputs include temperature information associated with a plate cylinder, and wherein, upon detecting a temperature change that has been shown to cause expansion or contraction of a plate cylinder based on the correlation data, the automatic registration and color adjustment device causes an affected plate cylinder component to be moved such that image registration and ink on a can are printed as specified by a label specification.

9. The system of claim 2, wherein the determined adjustment comprises making color adjustment of an ink based on the outputs and the correlation data.

10. The system of claim 9, wherein upon detecting a temperature change that has been shown to alter ink density based on the correlation data, the automatic registration and color adjustment causes the ink density to be adjusted to a specified level by a label specification.

11. The system of claim 1, wherein the automatic registration and color adjustment device is further structured to continuously collect and store current adjustment information and update the correlation data with the current adjustment information.

12. The system of claim 11, wherein the automatic registration and color adjustment device comprises a machine learning algorithm structured to train based on the updated correlation data.

13. The system of claim 1, wherein the plurality of sensors further comprises a humidity sensor disposed adjacent to the component temperature sensor.

14. A method of automatic registration and color adjustment, the method comprising:

providing an automatic registration and color adjustment system that comprises: (i) a can decorator including a plurality of plate cylinders and a plurality of inking stations, each plate cylinder being associated with an individual inking station; (ii) a plurality of sensors including an ambient temperature sensor structured to sense an ambient temperature associated with the can decorator and a component temperature sensor structured to sense a component temperature associated with one or more components of the can decorator; and (iii) an automatic registration and color adjustment device communicatively coupled to the can decorator and the plurality of sensors and including a memory structured to store previous adjustment information associated with the can decorator;

receiving, by the automatic registration and color adjustment device, outputs of the plurality of sensors;

determining, by the automatic registration and color adjustment device, an adjustment to one or more components of the can decorator based on the outputs of the plurality of sensors and the previous adjustment information; and controlling the can decorator to make the determined adjustment, wherein the previous adjustment information comprises at least a specific temperature change, time and date associated with the specific temperature change, effects of the specific temperature change on one or more specific can decorator components, a type and/or a degree of adjustment made to the one or more specific can decorator components in response to the specific temperature change, and correlation data for the specific temperature change, the time and date associated with the specific temperature change, the effects of the specific temperature change, and the specific type and/or degree of adjustment made in response to the specific temperature change, the method further comprising:

collecting and storing current adjustment information;

updating the correlation data with the current adjustment information; and training based on the updated correlation data.

15. The method of claim 14, wherein determining an adjustment to one or more components of the can decorator comprises:

comparing a current temperature change to previous temperature changes in the correlation data; and determining a type and/or a degree of the adjustment based on the correlation data.

16. The method of claim 14, wherein the determined adjustment comprises one or more of:

activating a temperature control element disposed at or adjacent to a can decorator component to control temperature thereof based on the outputs and the correlation data;

moving an affected can decorator component based on the outputs and the correlation data; and making color adjustment of an ink based on the outputs and the correlation data.

17. The method of claim 16, wherein activating a temperature control element comprises:

based on temperature information associated with adjacent ink rollers of an inking station, detecting a temperature changing at one or more adjacent ink rollers to be outside of a threshold; and causing a temperature control element disposed adjacent to the one or more adjacent ink rollers to control the temperature thereof.

18. The method of claim 16, wherein moving an affected can decorator component based on the outputs and the correlation data comprises:

based on temperature information associated with a plate cylinder, detecting a temperature change that has been shown to cause expansion or contraction of at least a plate cylinder based on the correlation data; and causing an affected plate cylinder component to be moved such that image registration and ink on a can are printed as specified by a label specification.

* * * * *